UNITED STATES PATENT OFFICE.

ROBERT OXLAND, OF SAN FRANCISCO, CALIFORNIA.

IMPROVED PROCESS IN REFINING SULPHUR.

Specification forming part of Letters Patent No. 54,586, dated May 8, 1866.

*To all whom it may concern:*

Be it known that I, ROBERT OXLAND, of San Francisco, in the county of San Francisco and State of California, have invented an Improved Process in Refining Sulphur, of which the following is a specification.

My improvements consist in the substitution of chemical agents for the process of sublimation in refining sulphur or in the supplementary employment of them for the completion of the process of refining by sublimation.

Crude sulphur, having been melted, settled, and skimmed, should be run off into a refining-cistern, which may be constructed of iron lined with lead or of cast-iron alone. In either case the cistern should be surrounded with a steam-tight jacket of wrought or of cast iron, the whole being made sufficiently strong to bear a pressure of sixty pounds to the square inch.

The melted sulphur in the refining-cistern, having been reduced to a temperature of 230° to 240° Fahrenheit, is carefully mixed with the refining agents in solution by rapid agitation of the mass until the whole is converted into a nearly dry pulverulent form. The steam should then be turned on into the jacket and the heat maintained until the whole mass is perfectly liquid. Agitation should then be recommenced and continued until gases are no longer evolved. The mixture should then be allowed to settle and the refined sulphur drawn off and cast into molds at as low a temperature as may be consistent with perfect fluidity.

The refining agents I prepare in the following manner: For the ton of two thousand pounds of settled crude sulphur, containing sulphides of mercury and of iron with other impurities, I take five pounds of nitrate of soda, seven pounds of chloride of sodium, and mix them together with water, making a cold saturated solution. I also take fourteen pounds of sulphuric acid and add thereto three pounds of water, and, after cooling the mixture to about 60° Fahrenheit, I carefully combine the dilute acid and the saturated solution of salts, so as to prevent the evolution of any gas. When cold the mixture will be ready for use in the manner hereinbefore described.

According to the condition of the settled crude sulphur and the nature of the impurities, the quantity of the mixture should be varied.

By experimental examination of definite small quantities the right proportion may be ascertained.

I do not confine myself to the use of the chemical agents above described, as, while these may be the best for ordinary circumstances, the addition or substitution of others may be necessary when other substances are present.

I claim—

The use of chemical agents in the manner hereinbefore described, either in substitution of the ordinary process of ublimation for refining sulphur or as supplementary thereto for the completion of the refining operation.

ROBERT OXLAND.

Witnesses:
CHAS. R. BOND,
HENRY HAIGHT.